United States Patent [19]

Liggett

[11] Patent Number: 5,182,092

[45] Date of Patent: Jan. 26, 1993

[54] HYDROXYLAMMONIUM NITRATE PROCESS

[75] Inventor: Thomas Liggett, Indian Head, Md.

[73] Assignee: The United States of America as represented by the Secretary of the Navy, Washington, D.C.

[21] Appl. No.: 662,647

[22] Filed: Mar. 1, 1976

[51] Int. Cl.$^5$ .............................................. C01B 21/20
[52] U.S. Cl. ................................... 423/387; 423/551; 423/555
[58] Field of Search ..................... 423/321 S, 551, 385, 423/387, 388, 555

[56] References Cited

U.S. PATENT DOCUMENTS

| | | | |
|---|---|---|---|
| 2,406,420 | 8/1946 | Weisen et al. | 423/628 |
| 2,414,142 | 1/1947 | Dreyfus et al. | 423/387 |
| 2,827,362 | 3/1958 | Bull et al. | 423/387 |
| 2,885,265 | 5/1959 | Cunningham | 423/321 S |
| 3,298,782 | 1/1967 | Archambault | 423/321 S |
| 3,331,661 | 7/1967 | Boiston et al. | 423/551 |

FOREIGN PATENT DOCUMENTS 530173 12/1940 United Kingdom ................ 423/388

OTHER PUBLICATIONS

"Handbook of Chemistry and Physics", CRC Press, Cleveland, Ohio, 55th Ed., 1974–1975, pp. B62 and B95.

*Primary Examiner*—Wayne A. Langel
*Attorney, Agent, or Firm*—Kenneth E. Walden

[57] ABSTRACT

A process for preparing hydroxylammonium nitrate which comprises reacting a hydroxylammonium salt, e.g., the sulfate, with an aqueous solution of a nitrate salt, e.g., sodium nitrate, in the presence of an organic solvent, e.g., butanol, in which the hydroxylammonium nitrate is soluble and the by-product salts are insoluble.

7 Claims, No Drawings

HYDROXYLAMMONIUM NITRATE PROCESS

BACKGROUND OF THE INVENTION

The present invention relates to a process for the production of hydroxylammonium nitrate. More particularly, the present invention relates to an improved process for the production of hydroxylammonium nitrate by combining the reactants in the presence of an organic solvent.

Hydroxylammonium nitrate solutions are traditionally made by the reaction of hydroxylammonium sulfate with barium nitrate solutions. The dilute hydroxylammonium nitrate solutions are removed from the by-product barium sulfate precipitate by decantation after settling. The precipitate is so fine that normal filtration and washing are practically impossible and settling is extremely slow, usually 8-16 hours. As several washes are required to recover the product, it can be realized that this is a slow process which is difficult to scale up commercially. The dilute hydroxylammonium nitrate solutions are then concentrated by removing the excess water with vacuum distillation. A further discussion of this process can be found in Proceedings of the Transactions of the Nova Scotia Institute of Science, 1902/1906 pages 95-115, "Contributions to the Study of Hydroxylamine and its Salts," by W. H. Ross.

Prior Art has revealed a number of other processes for producing hydroxylammonium nitrate including the catalytic hydrogenation of nitric acid; the catalytic reduction of nitrogen monoxide with hydrogen in an acid solution; and a process for converting hydroxylamine sulfate to hydroxylamine nitrate by passing an aqueous hydroxylamine sulfate solution through a cation exchange resin bed which absorbs the hydroxylamine, washing the sulfate ion from the resin bed and eluting the hydroxylamine nitrate with nitric acid. However, each of these methods appear to be complex, time consuming and relatively expensive in comparison to the method disclosed in the present invention.

SUMMARY OF THE INVENTION

Accordingly the present invention provides an improved method for the production of hydroxylammonium nitrate. In this process a hydroxylammonium salt is reacted with an aqueous solution of a nitrate salt in the presence of an organic solvent in which the hydroxylammonium nitrate is soluble and the undesired by-product is insoluble. Thereby, expensive hard to dispose of barium salts are replaced by sodium salts, excessive processing time is eliminated and a simplified method of separating the by-product from the hydroxylammonium nitrate is provided.

OBJECTS OF THE INVENTION

It is therefore an object of the present invention to provide an improved process for producing hydroxylammonium nitrate.

Another object of the present invention is to provide an economical process for the production of hydroxylammonium nitrate.

Yet another object of the present invention is to eliminate the need for using expensive and hard to dispose of barium salts.

Still a further object of the present invention is to eliminate the fine, difficult to separate barium sulfate from the process.

Yet another object of the present invention is to provide a commercially feasible large-scale continuous process for the production of hydroxylammonium nitrate.

Other objects and many of the attendant advantages of this invention will be readily appreciated as the same becomes better understood by reference to the following detailed description.

DESCRIPTION OF THE PREFERRED EMBODIMENTS

In accordance with the present invention hydroxylammonium nitrate, $NH_2OH \cdot HNO_3$, is prepared in the following manner. A hydroxylammonium salt such as hydroxylammonium sulfate, Hydroxylammonium chloride or hydroxylammonium acid sulfate is reacted with an aqueous solution of a nitrate salt such as sodium nitrate, potassium nitrate, ammonium nitrate or calcium nitrate. The reaction takes place in an organic solvent in which the hydroxylammonium nitrate is soluble and the crystalline by-product is insoluble. Butanol, ether, diethyl ether, lower ethers, lower alcohols and mixture thereof, are example of such organic solvents. Butanol as used in this specification refers to n-butyl alcohol, sec-butyl alcohol, and isobutyl alcohol, alcohols which are only partially soluble in water. As the reaction proceeds an insoluble crystalline by-product forms and is then easily separated from the organic solvent/hydroxylammonium nitrate solutions by an appropriate means. By regulating the water content and by countercurrent extraction, if necessary, essentially all of the hydroxylammonium nitrate can be recovered.

When butanol is used as the solvent, it will dissolve enough water to carry some water soluble impurities, such as sodium sulfate and nitrate, into the butanol solution. These precipitate out upon drying the alcohol and are removed by simple filtration. Any alcohol soluble impurities from the raw materials may then be eliminated by appropriate means e.g., treatment with activated alumina.

The hydroxylammonium nitrate is recovered from the purified organic solvent solution by any appropriate means such as counter current water extraction or distillation. Then, the purified hydroxylammonium nitrate is obtained by vacuum distilling the product to remove any final traces of the organic solvent and to adjust the water content of the hydroxylammonium nitrate solution.

Thus it is apparent that there is provided by this invention an improved process for producing hydroxylammonium nitrate solutions.

It is to be understood that what has been described is merely illustrative of the principles of the invention and that numerous arrangements in accordance with this invention may be devised by one skilled in the art without departing from the spirit and scope thereof.

What is new and desired to be secured by Letters Patent of the United States is:

1. A process for producing hydroxylammonium nitrate, which comprises the steps of:
    reacting a hydroxylammonium salt selected from the group consisting of hydroxylammonium sulfate, hydroxylammonium chloride, and hydroxylammonium acid sulfate with an aqueous solution of a nitrate salt selected from the group consisting of sodium nitrate, potassium nitrate, and calcium nitrate, and an organic solvent selected from the group consisting of n-butyl alcohol, sec-butyl alcohol, isobutyl alcohol and mixtures thereof and forming therein hydroxylammonium nitrate and mixtures thereof;

purifying the hydroxylammonium nitrate containing organic solvent solution; and recovering the hydroxylammonium nitrate salt from the organic solvent.

2. The process of claim 1 wherein said hydroxylammonium salt is hydroxylammonium sulfate.

3. The process of claim 1 wherein said nitrate salt is sodium nitrate.

4. The process of claim 1 where said purification of the hydroxylammonium nitrate containing organic solvent solution is accomplished by separating crystals of the insoluble by-product salts from said organic solvent.

5. The process of claim 1 wherein recovery of the hydroxylammonium salt from said purified organic solvent is accomplished by counter current water extraction.

6. The process of claim 1 wherein recovery of the hydroxylammonium salt from said purified organic solvent is accomplished by distillation.

7. A process for producing hydroxylammonium nitrate which comprises the steps of:

reacting hydroxylammonium sulfate with an aqueous solution of sodium nitrate, and a butanol selected from the group consisting of n-butyl alcohol, sec-butyl alcohol isobutyl alcohol, and mixtures thereof and forming therein hydroxylammonium nitrate and sodium sulfate;

purifying the hydroxylammonium nitrate containing butanol solution by separating out crystals of the insoluble sodium sulfate;

precipitating out water soluble impurities, carried into solution by dissolved water, from the butanol solution by drying said butanol solution and filtering the resultant suspension;

removing any alcohol soluble solution impurities by treating the butanol solution with activated alumina;

recovering the hydroxylammonium nitrate salt from the purified butanol solution by counter current water extraction; and, removing the last traces of butanol and adjusting the water content by vacuum distillation.

* * * * *